US008793577B2

(12) United States Patent
Schellingerhout et al.

(10) Patent No.: US 8,793,577 B2
(45) Date of Patent: Jul. 29, 2014

(54) METHOD AND APPARATUS FOR PROVIDING AN UNDO/REDO MECHANISM

(75) Inventors: Nicolaas Willem Schellingerhout, Eindoven (NL); Georgio Mosis, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1132 days.

(21) Appl. No.: 12/521,895

(22) PCT Filed: Jan. 8, 2008

(86) PCT No.: PCT/IB2008/050044
§ 371 (c)(1),
(2), (4) Date: Jul. 1, 2009

(87) PCT Pub. No.: WO2008/084437
PCT Pub. Date: Jul. 17, 2008

(65) Prior Publication Data
US 2010/0050188 A1  Feb. 25, 2010

(30) Foreign Application Priority Data

Jan. 11, 2007  (EP) .................................. 07100370

(51) Int. Cl.
G06F 3/0481  (2013.01)
G06F 9/44  (2006.01)
(52) U.S. Cl.
CPC .................................. G06F 9/4443 (2013.01)
USPC ............ 715/704; 715/700; 715/765; 715/273
(58) Field of Classification Search
USPC ........................................................ 715/704
See application file for complete search history.

(56) References Cited

U.S. PATENT DOCUMENTS

| 4,757,317 | A | * | 7/1988 | Henri et al. .................... 342/185 |
| 5,926,617 | A | * | 7/1999 | Ohara et al. .................... 358/1.9 |
| 6,111,575 | A | * | 8/2000 | Martinez et al. .............. 715/810 |
| 6,158,903 | A | * | 12/2000 | Schaeffer et al. ............. 709/204 |
| 6,271,863 | B1 | * | 8/2001 | Bose et al. ..................... 345/440 |
| 6,459,442 | B1 | * | 10/2002 | Edwards et al. .............. 715/863 |
| 6,807,306 | B1 | * | 10/2004 | Girgensohn et al. .......... 382/225 |
| 7,035,462 | B2 | * | 4/2006 | White et al. ................... 382/167 |
| 2002/0003540 | A1 | * | 1/2002 | Unuma et al. ................. 345/474 |

(Continued)

FOREIGN PATENT DOCUMENTS

EP          0453152 A2     10/1991
WO     2006051962 A1      5/2006

OTHER PUBLICATIONS

Bogdan Falkowski et al., "Development of user interface and drawing tools in digital image processing system for intracellular fluorescent dye concentration of living cells" Proceedings of SPIE 2002, vol. 4622, pp. 52-61.*
Adobe Photoworkshop CS2 Manual, "Using the Undo History Palette"; One page Document.

(Continued)

*Primary Examiner* — William Bashore
*Assistant Examiner* — Reza Nabi

(57) ABSTRACT

A method is described for providing a continuous undo/redo mechanism. The method comprises the steps of: —recording a history of a plurality of time stamped events based on reversible user actions. —navigating through the history by means of a continuous user input device, —translating the position of the continuous user input device to a point in time, and—identifying and displaying an intermediary state of the history based on the point of time.

15 Claims, 2 Drawing Sheets

(56) References Cited

U.S. PATENT DOCUMENTS

| | | | |
|---|---|---|---|
| 2003/0194720 A1* | 10/2003 | Roberds et al. | 435/6 |
| 2006/0066588 A1* | 3/2006 | Lyon et al. | 345/173 |
| 2006/0158459 A1* | 7/2006 | Ferguson et al. | 345/619 |
| 2010/0050188 A1* | 2/2010 | Schellingerhout et al. | 719/318 |
| 2010/0286516 A1* | 11/2010 | Fan et al. | 600/438 |

OTHER PUBLICATIONS

Falkowski et al: "Development of User Interface and Drawing Tools in Digital Image Processing System for Intracellular Fluorescent Dye Concentrations of Living Cells", Optical Diagnostics of Living Cells V, Daniel L. Farkas, Robert C. Leif, Editors, Proceedings of SPIE vol. 4622 (2002), pp. 52-61.

* cited by examiner

METHOD AND APPARATUS FOR PROVIDING AN UNDO/REDO MECHANISM

BACKGROUND OF THE INVENTION

1. Technical Field

The present invention relates to a method, software and apparatus for providing an undo/redo mechanism.

2. Description of Related Art

Undo/redo mechanisms are provided in the user interface of many computer applications. They provide the capability to "undo" tasks that were performed, previously by repeatedly pressing the undo button, which causes the application to undo commands one by one in reverse succession. Hereto, a history of user actions is stored by the computer application. Most user interfaces that include an undo command also include a redo command that allows a user to redo the last command that was just undone. In this manner a user can press the undo button repeatedly until he has backed up to a suitable point, and can then use the redo button if he has backed up too far, or if he decides to redo the task just undone. Instead of using mouse clicks for the navigation through the history, it is also known to scroll through a history list and select an item there from (web browser history). Undo/redo works well for a limited amount of undo/redo actions. If the number of actions is too great, for example in case of continuous change, such as occurs in surveying, exploring, measuring, or drawing, undoing by navigating through discrete actions becomes infeasible.

It is an object of the invention to provide an improved method and apparatus, which is particularly suitable for applications with continuous changes.

SUMMARY OF THE INVENTION

This and other objects of the invention are achieved by a method according to claim 1, a computer program according to claim 11 and an apparatus according to claim 14. Favorable embodiments are defined by the dependent claims 2-10, 12-13 and 15-16.

According to an aspect of the invention a method is provided for providing a continuous undo/redo mechanism. It comprises the steps of: recording a history based on continuously reversible user actions, navigating through the history by means of a continuous user input device, such as a slider or a knob, and identifying and displaying an intermediary state of the history based on a position of the continuous user input device. Continuity can be approximated to any desired degree, so according to the invention the user may undo/redo actions with any desired precision. The limited accuracy of the internal computer representation may limit the accuracy of the continuity. However, the use of the term "continuous" undo/redo mechanism in the present description means that the undo/redo mechanism is perceived by the user as continuous.

This invention is particularly useful for all applications that do not have a natural granularity. All currently known undo/redo techniques are incomplete in the sense that they throw away a lot of the history, by just taking snapshots of the activities, and not recording the activities continuously. An example of an application where the present invention can be advantageously used is drawing/sketching. When drawing or sketching, a user may want to undo a mistake such as the end of a stroke, thereby effectively continuously shortening the stroke until the user is satisfied. A further example is exploration. Exploration is used for example for the localization of the source of arrhythmia in the heart, by moving a catheter around to find a locus of anomalous timing behavior in the atrium wall of the heart. The explorer may decide that he is on the wrong track and want to backtrack to some point in time, to try an alternative exploration route.

U.S. Pat. No. 6,459,442 B1 discloses in FIG. 12 the use of a time slider tool to specify time points in a history of events. However, the undo/redo mechanism described in this patent is discrete. It only allows the deletion of complete strokes and collection of strokes.

Preferably in the present invention, the recorded history comprises a plurality of events recorded together with values of an ascending/decreasing function of time. The position of the continuous user input device, such as the analogue input from a slider or a knob, is translated to a value of the ascending/decreasing function of time. The intermediary state is identified and displayed based on the value. The recording of values of a sufficiently smooth monotonously ascending/decreasing function of time together with the history events, wherein the order of the events is preserved, is a very efficient way of implementing the continuous undo/redo mechanism according to the present invention.

The ascending/decreasing function of time may be the time itself and the recorded values of the function may be time values. This embodiment is simple to implement. The time values may be either time stamps of the events or time steps between the events.

There are basically two ways to record history for an undo/redo mechanism. The first way is recording reversible user actions and possibly external events. These are the user actions, possibly augmented with information specifically needed only to allow undoing. An example is the case of gaming: in order to recover from a crash in a racing game, one needs to record not only the user actions, but also the game state, such as position and speed of objects present in the game. The external values may also be measurement values. An example hereof is the above described exploration procedure used for the localization of the source of arrhythmia in the heart.

A second way is the recording of all intermediary states. This second way is useful in case of exploration applications but less useful in drawing/sketching. In such an application each intermediary state comprises a lot of data and this would possibly result in slow response.

The recorded history may be continuous. In terms of the present invention a continuous history means that the recorded time stamped events corresponds to the smallest perceivable user action. In case of the movement of an object, this may be dependent on the resolution of the display or alternatively, the precision of a user input device, such as a mouse.

According to a further embodiment the recorded event closest to the determined value of the ascending/decreasing function of time and the corresponding intermediary state is identified and displayed. In case that the recorded history is continuous, in this way an undo/redo mechanism is provided which is perceived as continuous by the user.

According to an alternative embodiment the earlier and later event closest to the value of the ascending/decreasing function of time are determined. An interpolation algorithm is used to identify the intermediary state corresponding to the value. According to this alternative embodiment it is not necessary that the recorded history is continuous, thereby allowing the recording of fewer events. In this way, less memory is needed and it is possible to obtain faster response. This embodiment is in particular useful in case of "predictable" user actions such as drawing a straight line or moving an object in a straight line. Of course the density of the recorded events should not be selected too low because that would affect the required precision.

In a further preferred embodiment the state closest to the position of the continuous user input device is continuously shown while navigating through the history. So, the user does not need to select a desired history state by pressing a key or clicking a mouse button, or the like. In this way, the user is always directly provided with the information needed to accurately navigate to the desired position.

Preferably, the method according to the invention is implemented by means of a computer program.

According to a further aspect of the invention an apparatus is provided for providing an undo/redo mechanism comprising: recording means for recording a history based on reversible user actions; a continuous user input device for navigating through the history; and identifying and displaying means for identifying and displaying an intermediary state of the history based on a position of the continuous user input device.

Preferably, the apparatus is a medical apparatus for performing electro physiological procedures. In electro physiological procedures there is a strong need for user interfaces allowing continuous undo/redo mechanisms, as provided by the apparatus according to the present invention.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

According to the invention a method is provided for continuous undo/redo. The method may be implemented by means of a computer program loaded on a computer.

According to the method a history based on reversible user actions is recorded. The history consists of a plurality of events. There are basically two ways to record history:

The first way is recording reversible user actions and possibly external events. These are the user actions, possibly augmented with information specifically needed only to allow undoing. An example is the case of gaming: in order to recover from a crash in a racing game, one needs to record not only the user actions, but also the game state, such as position and speed of objects present in the game. The external values may also be measurement values. An example hereof is the above described exploration procedure used for the localization of the source of arrhythmia in the heart.

The second way is recording all intermediary states, completely.

Figure 1:
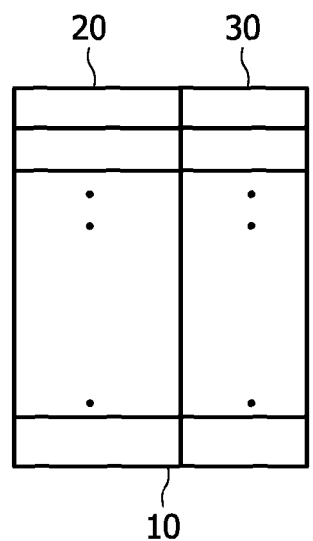
FIG. 1 shows a memory structure used for implementation of the method according to the invention.

FIG. 1 shows schematically a memory structure 10 used for implementing the step of recording the history. The memory structure 10 comprises a first part 20 for storing the history events. The history events may be either the user actions or the intermediary states, depending on the implementation. In a second part 30 of the memory values of an ascending function of time are stored, which are linked to the history events in the first part 20. Alternatively, the values of a decreasing function of time may be used. The stored values may be the values of the function corresponding to the history events or the step values between the events. The ascending function of time may be simply the time itself, because this is simple to implement. In this case time stamps corresponding to the events or time steps between the events may be stored. However, any other sufficiently smooth monotonously ascending function of time could be used, wherein the order of the user events is preserved. An example hereof is a function of time which increases relatively fast in a period of many user events and slowly in a period of few user events. This allows the user to pass a "quiet" period in history quickly when navigating through the history.

The method is now further explained for the case that the ascending function of time is the time itself and the history events are recorded together with corresponding time stamps.

According to a first example the recorded history is continuous. This means that the recorded time stamped events correspond to the smallest perceivable user action. In case of the movement of an object, this may be dependent on the resolution of the display or alternatively, the precision of a user input device, such as a mouse.

Figure 2:
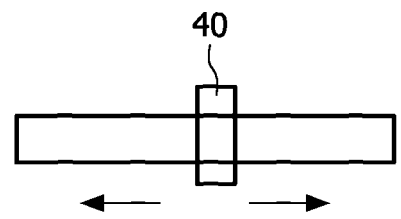
FIG. 2 shows a slider for use in the method according to the present invention.

A continuous user input device 40, shown in FIG. 2 is provided to the user for navigating through the history. The user input device 40 shown is a slider but also other continuous user input devices such as a knob may be used. The user may move forward or backward through the history by shifting the slider. If the user moves backwards, this results in all the previous actions being undone. If the user moves forward any actions, that were previously undone, are redone again. The slider may be implemented as a physical device but it may also be implemented as a button on a graphical user interface.

The analogue input from the slider is translated to a point in time. The undo mechanism then identifies the stored user action or intermediary state closest to the selected point in time.

Any measure of closeness can in principle be used. Basically, the point is to use closeness in time and not so much closeness in state, in order to preserve causality and a sense of continuity for the user. The system displays the intermediary state belonging to that point in time.

The system continuously shows the state closest to the selected position, while navigating through the history. In this way it is avoided that the user has to activate a selected intermediary state by a further user input action, such as pressing a key or clicking a mouse button.

According to the described method an undo/redo mechanism is provided, which is perceived by a user as continuous.

In an alternative example, the closest time stamped event earlier than the point in time corresponding to the position of the slider are determined and the closest time stamped event later than the point in time corresponding to the position of the slider are determined. An interpolation algorithm is then used to identify the intermediary state corresponding to this point in time. This intermediary state is displayed. This allows the density of the recorded history events to be decreased. This alternative example is based on the insight that for some user actions, such as the movement of an object in a straight line or the drawing of a straight line, or the rotation of an object, it is not necessary to have a very dense recorded history. Due to the predictability of these actions, interpolation may be used for providing an undo/redo mechanism that still is perceived by the user as continuous. Furthermore, the user can even go back to (approximations of) states that were not actually recorded.

The use of interpolation allows the degradation of the temporal resolution over time in order to avoid that the history becomes unmanageably large: older parts of the history may not require the temporal resolution needed for the most recent history. As an example: the last 10 seconds are recorded at 10 msec intervals, the last 100 seconds before that at 100 msec intervals, the last 1000 seconds before that at 1 second intervals, etc.

Figure 3:
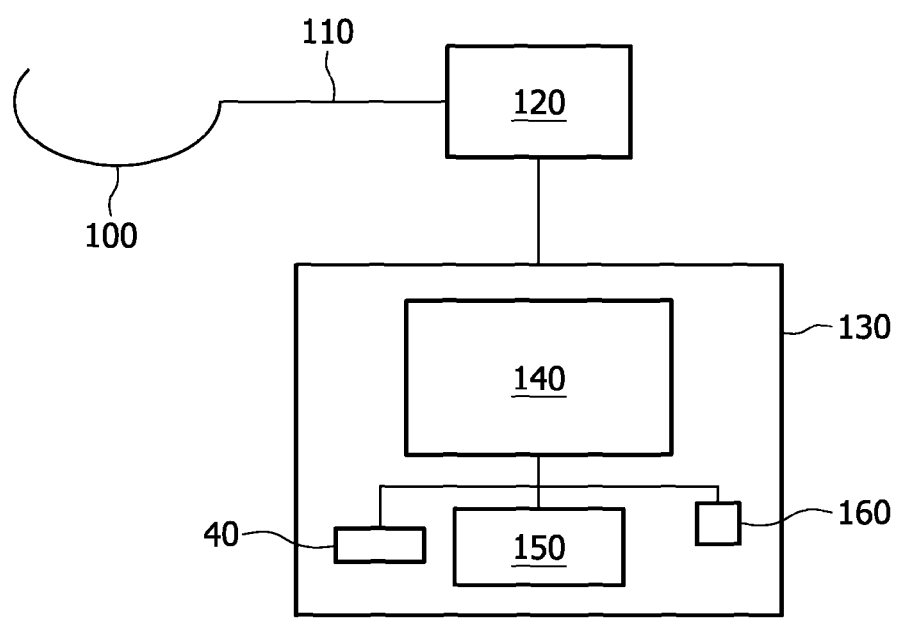
FIG. 3 shows a first application in which the method according to the invention may be advantageously implemented.

The method may be used for all applications that do not have a natural granularity. An example thereof is the domain of medical systems, and in particular the domain of electro physiology procedures. An example of an electro physiology procedure is the localization of the source of an arrhythmia in the heart. This can be done by moving a catheter around to find a location in the atrium wall of the heart with anomalous timing behavior. This is usually done by measuring the relative timing of activation of the heart tissue (the closer to the source, the earlier in time the activation will be) repeatedly at different locations. FIG. 3 schematically shows a block diagram of a medical system wherein the catheter is moved around. Apart from the catheter 100 the system comprises a push wire 110 and a driving mechanism 120. Medical staff may control the movement by issuing commands on a computer 130. The computer comprises a display 140 for showing the position of the catheter and input means comprising of a keyboard 150 and a mouse 160 for moving the catheter, amongst others. It furthermore comprises a slider 40 for continuous undo/redo. The computer 130 also comprises other known elements such as a processor, memories etc. (not shown).

The movement of a catheter for the localization of the source of an arrhythmia is an exploratory process where backtracking is very important. The operator may decide that he is on the wrong track and needs to go back to a known point, which was still OK, and then start an alternative exploration route.

The method may also be advantageously used for other applications in the medical field, such as registration. Registration is the process of aligning two images from different sources (e.g. X-ray and MR) so that anatomical features in both images coincide. Since this essentially involves moving a 3D object along 6 degrees of freedom (3 translation+3 rotation), using a 2D projection (the graphical display) to give the user feedback, this is a difficult task for the user.

Figure 4:
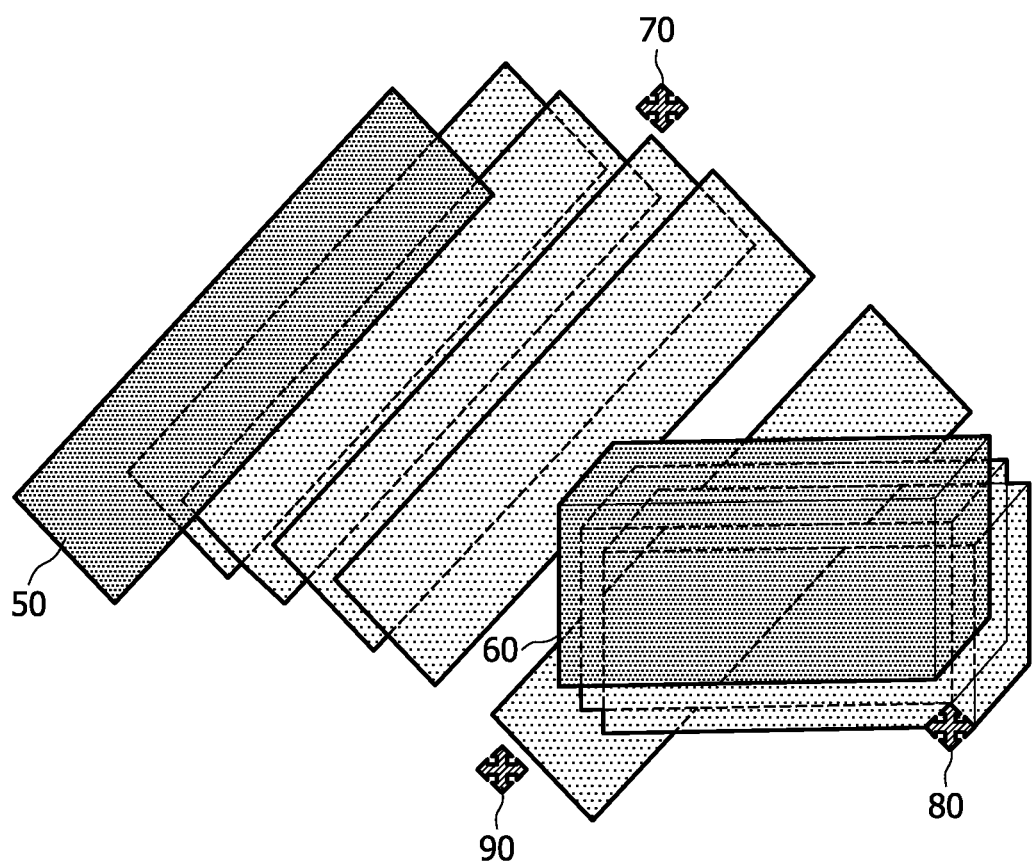
FIG. 4 shows a second application in which the method according to the invention may be advantageously implemented.

This is schematically shown in FIG. 4. It shows the 2 dimensional object 50 and the three dimensional object 60. The user may move the CT-object 50 on a continuous scale as indicated by arrow 70 and he MRI-object 60 on a continuous scale as indicated by arrow 80. This movement is performed by the user in a known way, for example by selecting the objects and dragging them by means of a mouse. In the figure a number of different positions of both objects are shown during the continuous movements. Finally, the continuous undo/redo mechanism as here described, may be advantageously used for fine tuning one of the objects on a continuous scale until it is perfectly mapped on the other object.

The invention can furthermore be applied to applications involving exploration, such as hiking: a GPS device normally records an entire trip. With the method above described, the user can erase the last part of the trip (the part where he took the wrong turn) and trace back to return to the last known good point.

A further application is multidimensional ("Artistic") design: when manipulating a multidimensional parametric design, the same can happen as described for the navigation procedure: the "just right" design passes and the user stops manipulating too late.

Of course the method can also be used in drawing/sketching applications: when drawing or sketching, a user might want to undo a mistake such as the end of a stroke, thereby continuously shortening the stroke until the user is satisfied.

A further application wherein the method may be used is computer games/simulations: in many games, the user can use "save game" to be able to step back to specific moments in time. This is a nuisance (one can forget to save your game, saving games is extra work, distracting from the game play), which can be avoided with the method current invention.

It is important here to allow the user to resume the game play with the controls pointing in the right direction. If a user crashes his car in a racing game, with the method described above he is able to roll back the action. But once the game is resumed, it needs to be ensured that the wheels are pointing in the right direction, and the accelerator pedal is pressed by just the right amount, etc. A solution there might be force-feedback technology: turn the wheel in the right direction and move the pedal to the right depth, before resuming the game play.

As will be recognized by those skilled in the art, the innovative concepts described in the present application can be modified and varied over a wide range of applications.

Accordingly, the scope of patented subject matter should not be limited to any of the specific exemplary teachings discussed, but is instead defined by the following claims.

Any reference signs in the claims shall not be construed as limiting the scope thereof.

The invention claimed is:

1. A method for providing a continuous undo/redo mechanism comprising acts of:
   recording a history based on continuously reversible user actions;
   navigating through the history by means of a continuous user input device;
   identifying and displaying an intermediary state of the history based on a position of the continuous user input device by:
      translating the position of the continuous user input device to a value of an ascending/decreasing function of time
      identifying a recorded event of a plurality of recorded events that occurred closer to the value of the ascending/decreasing function of time than any other recorded event of the plurality of recorded events;
      determining the intermediary state corresponding to the value using an interpolation algorithm; and
   displaying the determined intermediary state.

2. The method according to claim 1, wherein the plurality of recorded events are recorded together with the values of the ascending/decreasing function of time.

3. The method according to claim 2, wherein the ascending/decreasing function of time is time and the recorded values of the function are time values.

4. The method according to claim 3, wherein the values are time stamps of the events.

5. The method according to claim 3, wherein the values are time steps between the events.

6. The method according to claim 2, wherein the events are reversible user actions.

7. The method according to claim 2, wherein the events are intermediary states.

8. The method according to claim 1, wherein the acts of identifying and displaying are performed continuously.

9. A method for providing a continuous undo/redo mechanism comprising acts of:
- recording a history based on continuously reversible user actions;
- navigating through the history by means of a continuous user input device;
- identifying and displaying an intermediary state of the history based on a position of the continuous user input device by:
  - translating the position of the continuous user input device to a value of an ascending/decreasing function of time determining an earlier and later event that is closer to the value of the ascending/decreasing function of time than any other recorded earlier and later event of the plurality of recorded events; and
  - identifying the intermediary state corresponding to the value using an interpolation algorithm; and
  - displaying the identified intermediary state.

10. A computer program comprising non-transitory computer program code for operating on a computer for performing a method when said program is run on a computer, the method comprising acts of:
- recording a history based on continuously reversible user actions;
- navigating through the history by means of a continuous user input device;
- identifying and displaying an intermediary state of the history based on a position of the continuous user input device by:
  - translating the position of the continuous user input device to a value of an ascending/decreasing function of time
  - identifying a recorded event of a plurality of recorded events that occurred closer to the value of the ascending/decreasing function of time than any other recorded event of the plurality of recorded events;
  - determining the intermediary state corresponding to the value using an interpolation algorithm; and
- displaying the determined intermediary state.

11. The computer program as claimed in claim 10 embodied on a computer readable medium.

12. A carrier medium carrying the computer program of claim 10.

13. The apparatus according to claim 12, wherein the apparatus is adapted for performing electro physiological procedures.

14. An apparatus for providing an undo/redo mechanism comprising:
- a memory for recording a history based on continuously reversible user actions;
- a continuous user input device for navigating through the history;
- a processor configured to identify and display an intermediary state of the history based on a position of the continuous user input device by:
  - translating the position of the continuous user input device to a value of an ascending/decreasing function of time
  - identifying a recorded event of a plurality of recorded events that occurred closer to the value of the ascending/decreasing function of time than any other recorded event of the plurality of recorded events;
  - determining the intermediary state corresponding to the value using an interpolation algorithm; and
- displaying the determined intermediary state.

15. The apparatus according to claim 14 being a medical apparatus.

* * * * *